United States Patent [19]

Chisholm et al.

[11] Patent Number: 4,497,662

[45] Date of Patent: Feb. 5, 1985

[54] MOULDED PRODUCT

[75] Inventors: Donald M. Chisholm; Colin Newton; Stanley W. Winchester, all of Adelaide, Australia

[73] Assignee: Douglas Ross Fleet, Birdwood, Australia; a part interest

[21] Appl. No.: 468,075

[22] Filed: Feb. 22, 1983

[51] Int. Cl.³ ............................................... C04B 7/352
[52] U.S. Cl. ........................................ 106/92; 106/93; 106/99; 264/86; 264/109; 264/128; 264/299; 264/319; 264/330; 264/333; 425/84; 425/412
[58] Field of Search ............... 264/86, 299, 69, 125, 264/126, 122, 128, DIG. 7, DIG. 59, 336, 109, 119, 319, 330, 333; 425/404, 84, 412; 106/92, 93, 99; 428/283, 326

[56] References Cited

U.S. PATENT DOCUMENTS

| 1,882,191 | 10/1932 | Purinton | 264/86 |
| 3,596,314 | 8/1971 | Krugler | 425/84 |
| 3,929,947 | 12/1975 | Schwartz | 264/261 |
| 3,969,459 | 7/1976 | Fremont | 264/109 |
| 3,981,950 | 9/1976 | Pletzer | 264/125 |
| 4,073,658 | 2/1978 | Ohtani | 106/92 |
| 4,339,363 | 7/1982 | Nakagima | 264/126 |

Primary Examiner—Jay H. Woo
Assistant Examiner—Mike McGurk
Attorney, Agent, or Firm—Jay L. Chaskin

[57] ABSTRACT

A process of moulding a product (and a product thus formed) wherein particulate ligno-cellulose such as shredded paper, flour, Portland cement, a small amount of caustic soda, and water are mixed together, placed in a mould, and subjected to both pressure and heat until set, and the moulded product is then removed from the mould.

8 Claims, 3 Drawing Figures

MOULDED PRODUCT

This invention relates to a product which is formed by a moulding process, and the process of moulding a product.

BACKGROUND OF THE INVENTION

The moulding of ligno cellulose products has been proposed heretofore, and for example chips formed from pinus radiata timber are sometimes moulded into sheets known as chip board, wherein the chips are adhered together with an adhesive or glue material. Proposals have also been made to mould chip board into various shapes, for example funeral caskets. However, there are a number of problems which are encountered with this process:

Firstly the cost of the adhesive material used is so high that the chip board is excessively expensive, and this price is likely to rise if there is a rise in the cost of the oil which is a basic material for the production of the adhesive material presently used.

Secondly, with only a few exceptions, it is difficult to mould a product having chip board to have an outer lamina thereby increasing the strength of the product. Thus for example it is not considered feasible to produce a product having aluminium as the outer lamina of a chip board product.

Thirdly, the cost of the chips themselves is an increasing cost, and the production of the chips requires the use of specialised machinery requiring a high capital investment.

Fourthly, chip board is formed by a process which includes the application of large quantities of heat and pressure, and additionally for these reasons the capital investment required is quite high.

The main object of this invention is to provide a process for the moulding of a product which incorporates ligno cellulose material, either with or without outer laminae wherein the material cost and the capital cost is much less than with say chip board, but wherein a product with satisfactory mechanical characteristics can be formed. The invention also relates to a product moulded by the process.

BRIEF SUMMARY OF THE INVENTION

In this invention, particulate carbo-hydrate such as shredded paper, material containing starch, plaster of Paris or Portland cement, a small amount of caustic soda, and water are mixed together, placed in a mould, and subjected to both pressure and heat until set, and the moulded product is then removed from the mould.

In this invention the basic materials are relatively inexpensive. Shredded paper can be a waste material. Use is also made of Portland cement, itself relatively inexpensive and starch which is also relatively inexpensive. The pressure required is of the order of 20 lbs per square inch, and the temperature for curing can be less than 200° F., and for drying can be less than 120° F. Thus the cost of the capital equipment required need not necessarily be high.

More specifically, this invention consists of a process for moulding an article, comprising (a) forming a mixture of between 32 and 48 parts by weight of particulate ligno-cellulose, between 24 and 36 parts by weight of flour, between 0.7 and 1.3 parts by weight of caustic soda, between 32 and 48 parts by weight of Portland cement, and a quantity of water equal to between 30% and 70% of the total weight of the other said components, (b) placing said mixture in a mould, subjecting it to sufficient pressure for water to escape from said mixture, and heating the mixture to a temperature of between 150° F. and 300° F. (66° C. and 150° C.) until set, and (c) removing the set article from the mould.

Most of the component quantities can vary plus or minus 30% to provide alternative product characteristics.

BRIEF DESCRIPTION OF THE DRAWINGS

An embodiment of the invention is described hereunder in some detail with reference to and is illustrated in the accompanying drawings, in which.

Figure 1:
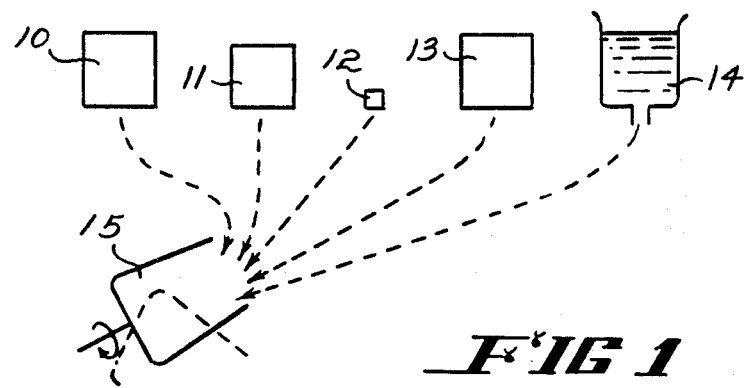
FIG. 1 is a diagrammatic representation of a mixing process.
Figure 2:
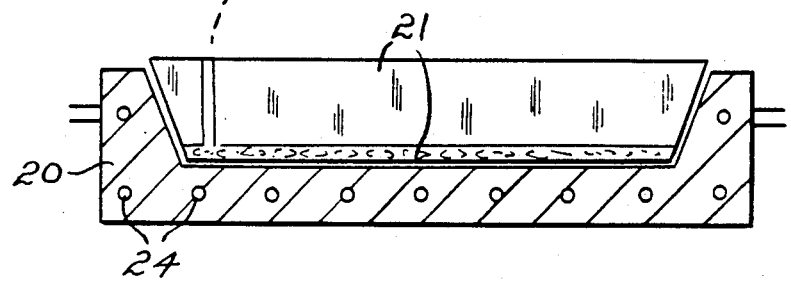
FIG. 2 is a diagrammatic representation of a first stage of a moulding process, wherein the mixture of FIG. 1 is placed into a female die.
Figure 3:
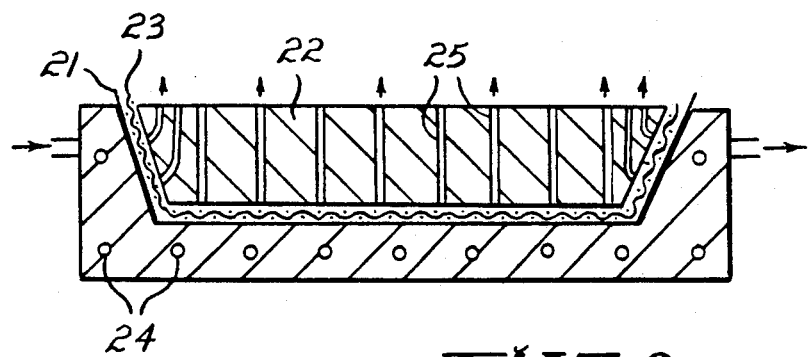
FIG. 3 is a diagrammatic representation of a second stage of the process, showing the mixture subjected to heat and pressure.

In this embodiment, scrap paper 10 (or other lignocellulose material which has undergone a digestion process) is shredded and weighed to provide 40 parts by weight (plus or minus 20%), plain wheaten flour 11 (or other particulate material containing starch in powder form) is weighed to provide 30 parts by weight (plus or minus 20%), 1 part by weight of caustic soda 12 is added and 40 parts by weight (plus or minus 20%) of Portland cement powder 13 is added. Other hydrolyzible calcium based material such as plaster of Paris may be used in lieu of the Portland cement. A quantity of water 14 equalling about 50% of the total weight of the above components is then added to make a wet mix, and in some instances a fast setting agent, for example as sold under the trade mark QUICKSET (being a trade mark of Cement Aids International Pty. Ltd., of South Australia), to quickly set the Portland cement. The whole mixture is thoroughly mixed in a mixer 15. The caustic soda has the facility to soften or break up the ligno cellulose fibres of the paper, and blend the fibres together as a soft pulp. The caustic soda also functions as a gelling or setting agent, and still further, as an etching agent if the mouldable material is to be moulded onto aluminium for example. It also has a minor effect in hydrolyzing the Portland cement.

The water quantity can vary between 30% and 70% by weight of the dry mixture, the more water used, the more fluent the wet mix, but the strength imparted by the Portland cement is impaired if excessive quantities of water are used.

A female mould 24 is then lined with a lamina 21 consisting of heavy grade paper (cartridge paper or the like), and a male mould 22 is covered with coarse hessian 23. The female mould 20 is also provided with a plurality of water heating tubes 24, and hot water is passed through the female mould as the male mould is pressed into the female mould, applying a pressure of approximately 20 psi to the mouldable products. However, this pressure can widely vary. The hot water in the female mould is maintained at about 200° F., (93° C.), (between 150° F. and 300° F., or 66° C. and 150° C.), so that at least some heating is imparted to the product during its moulding.

Although the amount of water which is used in the mixture can make a large difference to the curing time, normally after about 20 minutes of retaining the material under pressure and temperature as described above, the moulds can be separated and the product removed. The water and water vapour escape through apertures 25 in the male mould 22. The product can of course be any one of a number of products, one suitable product being a funeral casket, which is subsequently further processed by the application of decorative material, for example "wood grain paper" adhered to the outer surface. However, the product before being subsequently processed in this manner is cured in a curing oven, use being made of dry heat at a temperature of between 90° F. and 120° F. (32° C. and 50° C.) and for a period of about 24 hours. In many instances less time is required.

The subsequent process can include the use of a plastic liner within the casket, and the application of waterproof material to the outer surface, preferably after the decorative material has been adhered.

The product made according to this invention will burn well for crematorium work, but for other products a flame retardant may be added.

For example, the mouldable material can be used as the "meat in a sandwich" between, say, an outer lamina of aluminium and an inner lamina of structural paper. It can be used between outer laminae in the panels of doors. It has self-adhesive properties and does not require the addition of further adhesive. It can be provided with chemicals which will discourage attack by termites, mice or other vermin. Water-proofing can be used, for example, tannin, silicon or other known water-proofing chemicals.

A consideration of the above embodiment will indicate the invention, although very simple, provides a product and process which is usable economically over a very wide range of applications.

Various modification in structure and/or function and/or steps may be made by one skilled in the art to the disclosed embodiment of the invention without departing from the scope of the invention as defined by the claims.

What is claimed is:

1. A process for moulding an article, comprising:
   (a) forming a mixture of between 32 and 48 parts by weight of shredded paper, between 24 and 36 parts by weight of plain wheaten flour, between 0.7 and 1.3 parts by weight of caustic soda, between 32 and 48 parts by weight of Portland cement, and a quantity of water equal to between 30% and 70% of the total weight of the other said components,
   (b) placing a lining of sheet material into a female mould, and pouring said mixture into said female mould,
   (c) placing perforate sheet material over the surface of a vented male mould, and urging the male mould into the female mould and imparting a pressure to said mixture,
   (d) heating said female mould to a temperature of between 66° C. and 150° C. until set, and
   (e) removing said article from the mould.

2. A process according to claim 1 comprising curing said article by heating after removal from the mold.

3. A process according to claim 2 wherein said curing temperature lies between 32° C. and 50° C.

4. An article made by the process of claim 1.

5. A process for moulding an article in a mould comprising:
   (a) forming a mixture of between 32 and 48 parts by weight of particulate ligno-cellulose, between 24 and 36 parts by weight of flour, between 0.7 and 1.3 parts by weight of caustic soda, between 32 and 48 parts by weight of Portland cement, and a quantity of water equal to between 30% and 70% of the total weight of the other said components,
   (b) placing said mixture in a mould, subjecting it to sufficient pressure for water to escape from said mixture, and heating the mixture to a temperature of between 150° F. and 300° F. (66° C. and 150° C.) until set, and
   (c) removing the set article from the mould.

6. A process according to claim 5 comprising curing said article by heating after said removal from the mould.

7. A process according to claim 6 wherein said curing temperature lies between 32° C. and 50° C.

8. An article made by the process of claim 5.

* * * * *